(12) United States Patent
Ghosh (10) Patent No.: US 9,827,533 B2
(45) Date of Patent: Nov. 28, 2017

(54) METHOD AND APPARATUS FOR REDUCING THE TOTAL DISSOLVED SOLIDS OF A SOLUTION

(71) Applicant: New Mexico Tech Research Foundation, Socorro, NM (US)

(72) Inventor: Ashok Kumar Ghosh, Albuquerque, NM (US)

(73) Assignee: NEW MEXICO TECH RESEARCH FOUNDATION, Socorro, NM (US)

( * ) Notice: Subject to any disclaimer, the term of this patent is extended or adjusted under 35 U.S.C. 154(b) by 0 days.

(21) Appl. No.: 15/148,950

(22) Filed: May 6, 2016

(65) Prior Publication Data
US 2016/0250599 A1    Sep. 1, 2016

Related U.S. Application Data

(62) Division of application No. 13/223,908, filed on Sep. 1, 2011, now Pat. No. 9,370,747.

(51) Int. Cl.
| | | |
|---|---|---|
| *B01D 61/00* | (2006.01) | |
| *B01D 65/08* | (2006.01) | |
| *B01D 63/06* | (2006.01) | |
| *B01D 69/04* | (2006.01) | |
| *C02F 1/44* | (2006.01) | |

(Continued)

(52) U.S. Cl.
CPC ........... *B01D 65/02* (2013.01); *B01D 61/002* (2013.01); *B01D 63/00* (2013.01); *B01D 65/08* (2013.01); *C02F 1/445* (2013.01); *B01D 63/06* (2013.01); *B01D 69/04* (2013.01); *B01D 2313/20* (2013.01); *B01D 2321/2041* (2013.01); *B01D 2321/30* (2013.01)

(58) Field of Classification Search
CPC ...... B01D 63/06; B01D 69/04; B01D 69/043; B01D 69/046; B01D 61/002; B01D 61/005; B01D 2311/103; B01D 2313/08; B01D 2313/32; B01D 2313/90; B01D 2321/20; B01D 2321/2033; B01D 2321/2041; C02F 1/445
See application file for complete search history.

(56) References Cited

U.S. PATENT DOCUMENTS

| | | |
|---|---|---|
| 3,130,156 A | 4/1964 | Neff |
| 3,171,799 A | 3/1965 | Batchelder |
| 3,216,930 A | 11/1965 | Glew |

(Continued)

OTHER PUBLICATIONS

Ng et al. Performance of forward (direct) osmosis process: Membrane structure and transport phenomenon. Environ. Sci. Technol. (2006) vol. 40, pp. 2408-2413.

*Primary Examiner* — Katherine Zalasky
(74) *Attorney, Agent, or Firm* — Johnson, Marcou & Isaacs, LLC; Jennifer S. Stachniak (57) ABSTRACT

An apparatus for reducing the total dissolved solids of a solution includes a unit having at least two chambers; a respective semi-permeable membrane arrangement disposed between each of the at least two chambers; a device for introducing respective solutions into, and withdrawing solutions from, the chambers; and at least one paddle disposed in each of said chambers. The paddles are configured to sweep opposite sides of each of the semi-permeable membrane arrangements. A device provides relative movement between the paddles and the semi-permeable arrangements.

8 Claims, 10 Drawing Sheets

(51) Int. Cl.
*B01D 65/02* (2006.01)
*B01D 63/00* (2006.01)

(56) References Cited

U.S. PATENT DOCUMENTS

| | | |
|---|---|---|
| 3,532,621 A | 10/1970 | Hough |
| 3,541,004 A * | 11/1970 | Cooper ............... B01D 65/02 |
| | | 210/414 |
| 3,670,897 A | 6/1972 | Frank |
| 3,707,231 A | 12/1972 | Bradley |
| 3,721,621 A | 3/1973 | Hough |
| 3,743,597 A | 7/1973 | Credali |
| 3,978,344 A | 8/1976 | Jellinek |
| 4,177,146 A * | 12/1979 | Popper ................. F03G 7/005 |
| | | 210/137 |
| 4,362,627 A | 12/1982 | Fly et al. |
| 4,549,947 A | 10/1985 | Inoue et al. |
| 5,096,574 A | 3/1992 | Birdsong et al. |
| 6,391,205 B1 | 5/2002 | McGinnis |
| 7,455,109 B2 | 11/2008 | Collins |
| 7,608,188 B2 | 10/2009 | Cath et al. |
| 7,832,714 B2 | 11/2010 | Duesel |
| 2004/0262234 A1 | 12/2004 | Warren et al. |
| 2006/0144759 A1 | 7/2006 | Wakui |
| 2006/0237366 A1 | 10/2006 | Al-Mayahi |
| 2010/0140162 A1 | 6/2010 | Jangbarwala |

\* cited by examiner

Figure 3: Cross Sectional View

Figure 5 : As the flow continues, the situation changes from the condition as shown in Figure 4 to that in figure 5.

Figure 7: A second paddle is added in the draw side.

METHOD AND APPARATUS FOR REDUCING THE TOTAL DISSOLVED SOLIDS OF A SOLUTION

CROSS REFERENCE TO RELATED APPLICATIONS

The present application is a divisional application of U.S. application Ser. No. 13/223,908, filed Sep. 1, 2011.

BACKGROUND OF THE INVENTION

The present invention relates to a method and apparatus for reducing the total dissolved solids of a solution, especially a highly concentrated solution, such as a saline solution that is far more concentrated than seawater.

It is an object of the present invention to provide an improved osmosis method and apparatus that overcomes drawbacks of heretofore known processes.

BRIEF DESCRIPTION OF THE DRAWINGS

This object, and other objects and advantages of the present application, will appear more clearly from the following specification in conjunction with the accompanying schematic drawings, in which.

SUMMARY OF THE INVENTION

The inventive method of reducing the total dissolved solids of a solution includes the steps of conveying a feed solution to at least one first chamber of a unit having at least two chambers; conveying a draw solution to at least one second chamber of the unit that is adjacent to the at least one first chamber, wherein a semi-permeable membrane arrangement is disposed between each of the first and second chambers, further wherein the draw solution has a greater molar concentration than does the feed solution, further wherein solvent from the feed solution is adapted to be drawn through the membrane arrangement into the draw solution, thereby reducing the solute concentration of the draw solution and increasing the solute concentration of the feed solution, and wherein localized solute depositions occur within the membranes and/or on an external surface of the membranes that faces a feed solution chamber; providing continuous sweeping of opposite external surfaces of the membranes to at least reduce the solute depositions on the surface facing the feed solution chamber, and to remove liquid permeate molecules from that external surface of the membranes that faces a draw solution chamber; and withdrawing from the unit feed solution that is more concentrated than that conveyed to the unit and draw solution that is more diluted than that conveyed to the unit.

The apparatus for reducing the total dissolved solids of a solution comprises a unit having at least two chambers; a respective semi-permeable membrane arrangement disposed between each of the at least two chambers; means to introduce respective solutions into, and withdraw solutions from, the chambers; at least one paddle disposed in each of the chambers, wherein each of the paddles is configured to sweep opposite sides of each of the semi-permeable membrane arrangements; and means to provide relative movement between the paddles and the semi-permeable arrangements.

Further specific features of the present application will be described in detail subsequently.

DESCRIPTION OF SPECIFIC EMBODIMENTS

Referring now to the drawings in detail, the method and apparatus of the present application will be described primarily in conjunction with the desalination of water. However, it is to be understood that the method and apparatus of the present application can also be utilized to reduce the total dissolved solids of other solutions, especially highly concentrated aqueous solutions.

Figure 1:
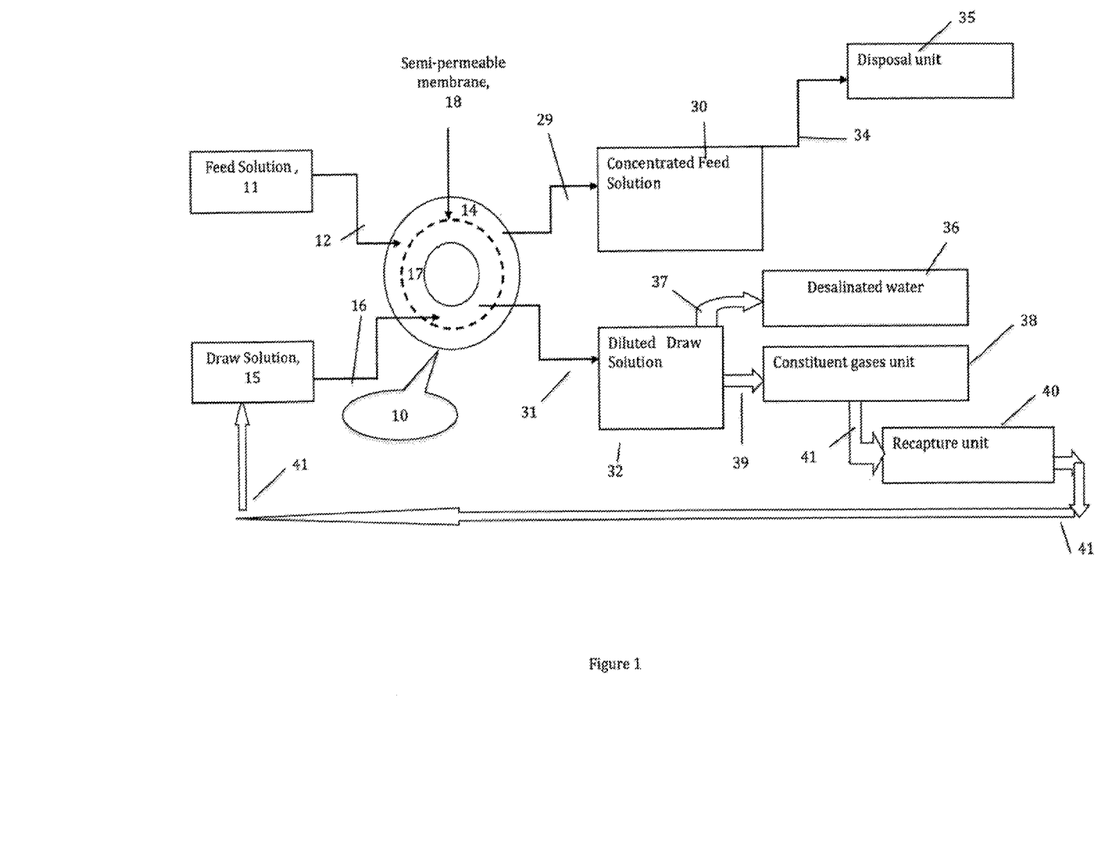
FIG. 1 is a flow diagram illustrating the method and apparatus of the present invention in connection with a two-chamber raceway unit.
Figure 8:
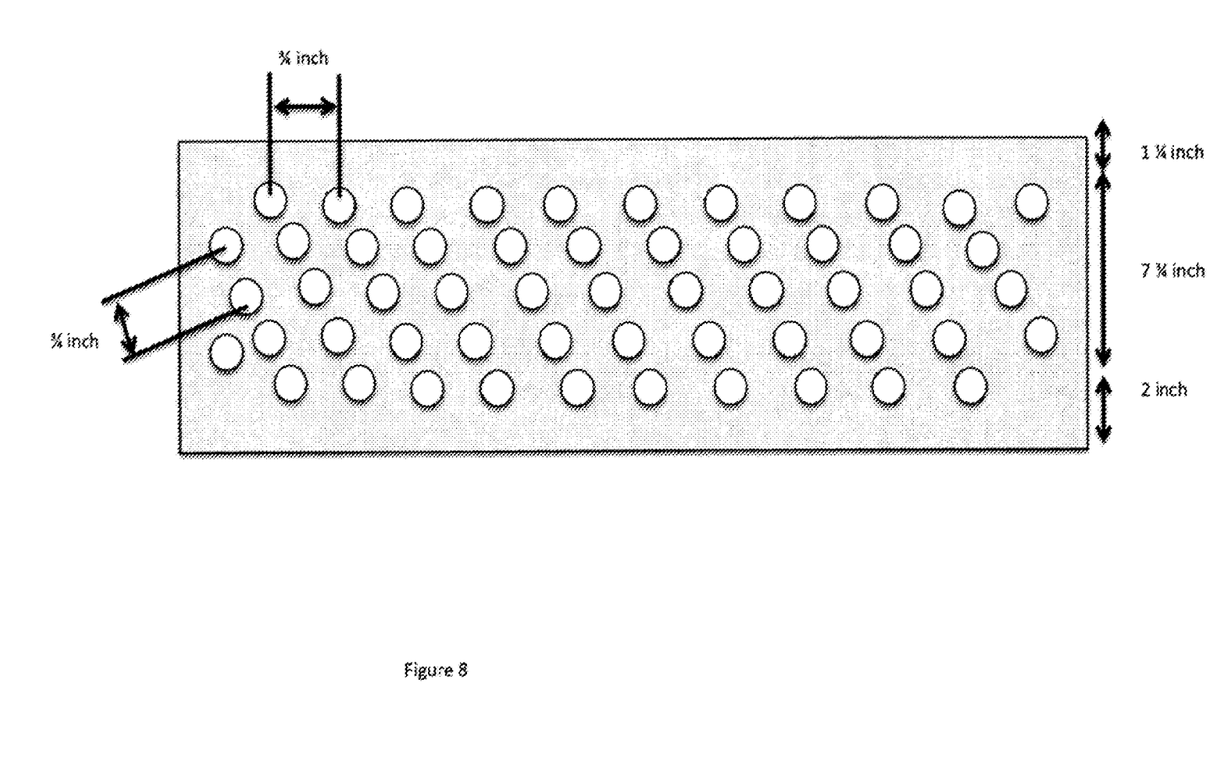
FIG. 8 illustrates an exemplary embodiment of a chamber-separating material sheet.
Figure 9:
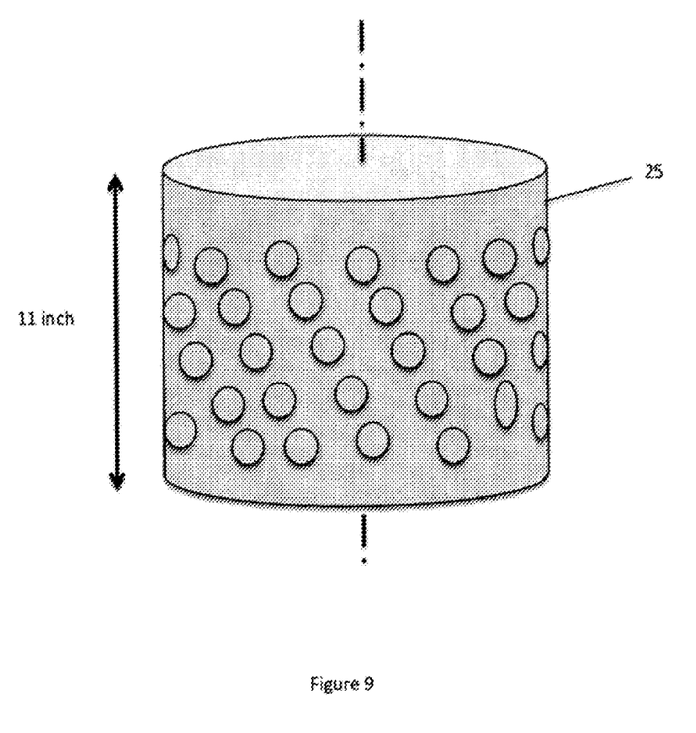
FIG. 9 illustrates an exemplary embodiment of a chamber-separating ring in its configuration as one of several concentric rings.

The flow diagram of FIG. 1 schematically illustrates the method of the present application, and in particular in connection with a two-chamber raceway unit, which is designated generally by the reference numeral 10. From a supply tank 11, a first solution, designated the feed solution, is conveyed, in the direction of the arrow 12, to a first chamber 14 of the raceway unit 10. Similarly, from a supply tank 15, a second solution, designated the draw solution, is conveyed, in the direction of the arrow 16, to a second chamber 17 of the raceway unit 10. The first and second chambers 14 and 17 of the unit 10 are separated from one another by a semi-permeable membrane containing, ring 18, such as the apertured ring shown in FIGS. 8 and 9. Of course, it is to be understood that any other suitable separator can be used that is capable of supporting the semi-permeable membrane.

Figure 2:
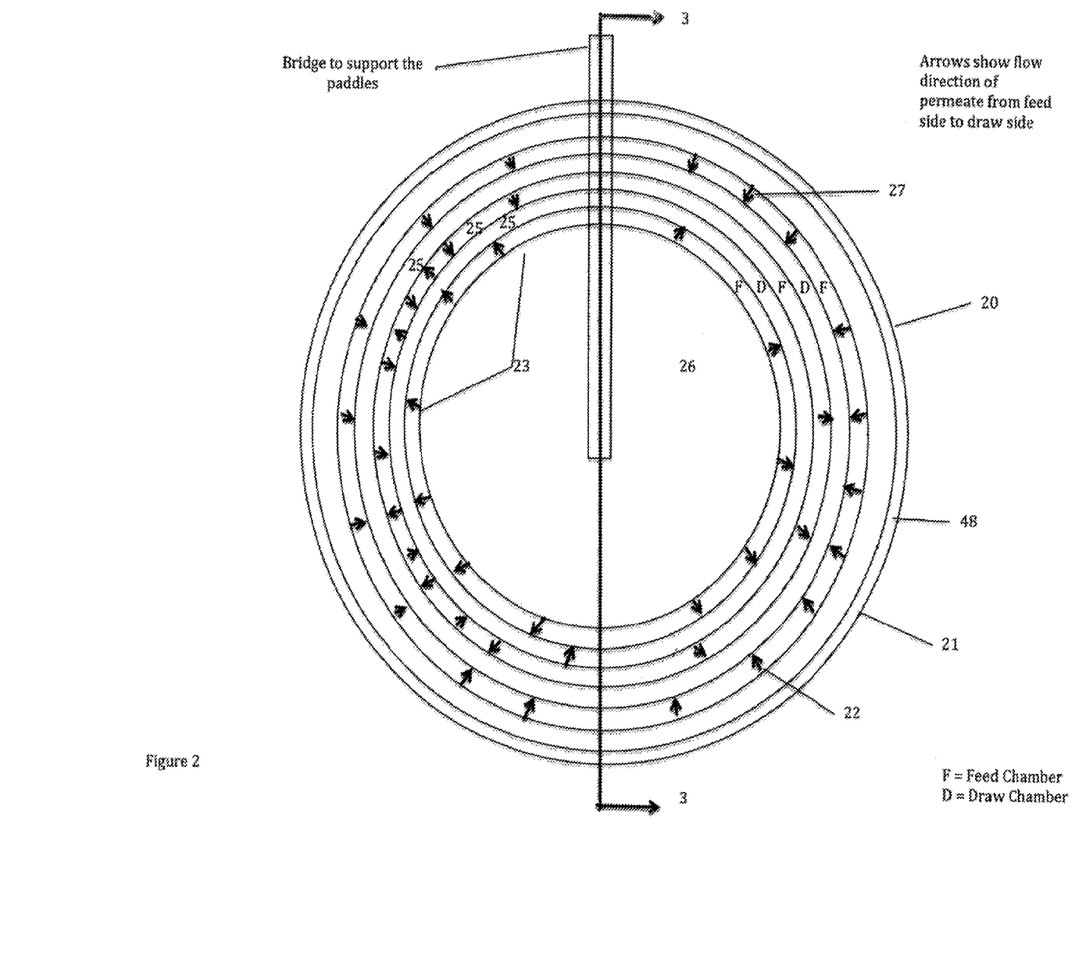
FIG. 2 is a plan view onto an exemplary embodiment of the present invention in connection with a five-chamber raceway unit.
Figure 3:
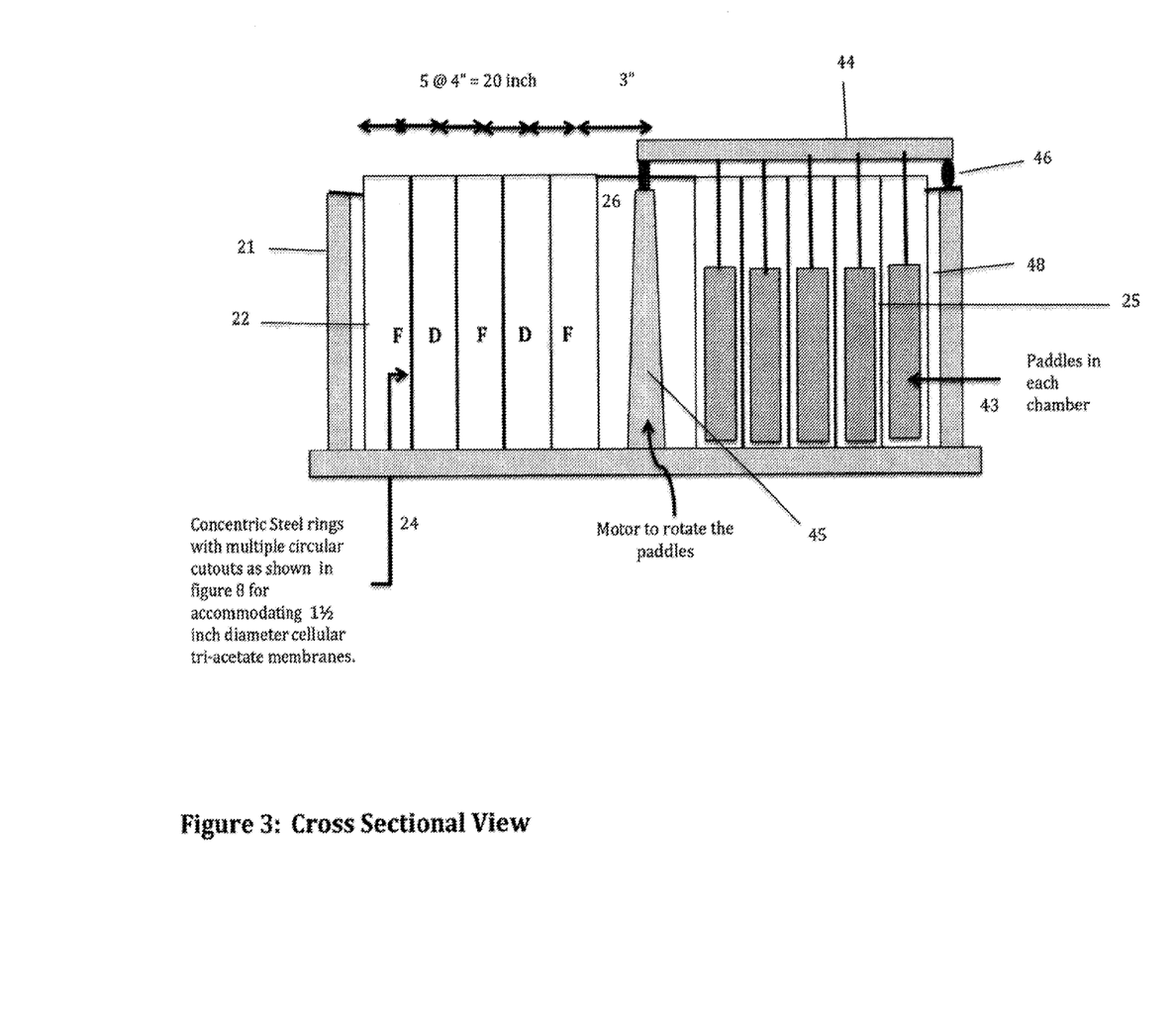
FIG. 3 is a cross-sectional view taken along the line 3-3 in FIG. 2.

Details of a raceway unit configured in conformity with the present invention, and how such a raceway unit functions, will now be described in detail in conjunction with FIGS. 2 and 3. In particular, the embodiment illustrated in FIGS. 2 and 3 schematically illustrates a five-chamber raceway unit, which is designated generally by the reference numeral 20. The unit 20 has an outer tank, bounded by the wall 21, and an inner tank, which is radially outwardly delimited by a wall or ring 22. The various feed solution chambers, labeled F, and draw solution chambers, labeled D, are disposed in the inner tank. The inner tank is radially inwardly delimited by a wall or ring 23. In the illustrated embodiment, all of the tank walls and separators or rings are formed by concentric walls and rings, although a linear configuration would also be conceivable.

Formed between the outer ring 22 and the inner ring 23, i.e. in the inner tank, are the chambers F and D, wherein disposed on each side of a draw solution chamber D is a respective feed solution chamber F. Thus, in the embodiment illustrated in FIGS. 2 and 3, there are two draw solution chambers D and three feed solution chambers F. Separating the feed solution chambers and the draw solution chambers from one another are respective spaced-apart separators or rings 25 that support a semi-permeable membrane arrangement. One exemplary embodiment of the membrane-supporting separator or ring 25 can be seen in FIGS. 8 and 9. Here, the stainless steel material is provided with a plurality of circular cutouts that accommodate the semi-permeable material, such as cellulose acetate or triacetate membranes, by way of example only.

In the illustrated embodiment, four concentric semi-permeable membrane containing rings 25 are provided, which in conjunction with the outer ring 22 and the inner ring 23 form the five solution chambers of the inner tank. A central space or chamber 26 is formed in the middle of the raceway unit 20 for a purpose to be described in greater detail subsequently.

The raceway unit 20 operates as follows. The feed solution and the draw solution are respectively introduced into the designated chambers in any inconvenient manner, as indicated very schematically by the arrow 24 (see FIG. 3). Such a feed can be effected by any suitable conduit system, which would include appropriate valves and pumps. The feed solution, which is in particular a highly concentrated solution, such as a concentrated saline solution, has a given molar concentration. In order to provide a gradient in osmotic pressure between a feed solution chamber F and a draw solution chamber D, the draw solution has a molar concentration that is greater than the molar concentration of the feed solution. There is thus a difference in chemical potential on opposite sides of each membrane-supporting ring 25, which allows the solvent in the feed solution to flow or be drawn through the semi-permeable membranes of the rings 25 (the membranes are permeable to the solvent of the feed solution but impermeable to the solutes thereof), and into the draw solution that is on the other side of the ring 25. The arrows 27 in FIG. 2 show the direction of flow of the solvent of the feed solution from the feed solution chambers F, through the membranes of the rings 25, and into the draw solution chambers D.

The manner of operation of the raceway unit 10 of the two-chamber embodiment illustrated in FIG. 1 is comparable to that described in conjunction with the five-chamber raceway unit embodiment of FIGS. 2 and 3.

The above-described osmosis process results in concentration of the feed solution, and dilution of the draw solution. When a desired concentration of feed solution is obtained, the concentrated solution can be withdrawn, as indicated by the arrow 29 and the block 30 in FIG. 1. Similarly, diluted draw solution can be withdrawn as indicated by the arrow 31 and the block 32. The feed solution chambers F and the draw solution chamber D can then be resupplied with fresh feed solution and draw solution respectively. Alternatively, in order to ensure that the draw solution always has a greater molar concentration than does the feed solution, more solvent can be added to the feed solution chambers F, and more solute or constituent materials could be added to the draw solution.

Where the feed solution solvent is water, the constituent or constituents for the draw solution, here an aqueous solution, could, by way of example only, be ammonium bicarbonate and/or ammonium hydroxide. Other potential draw solution constituents include magnesium chloride, calcium chloride, sodium chloride, potassium chloride, sucrose, magnesium sulphate, and potassium nitrate. Some combination of the two approaches would also be possible. In addition, the method of the present application can be operated in a batchwise manner, or continuously.

From block 30, the concentrated feed solution can be withdrawn to a disposal unit, as shown by the arrow 34 and the block 35. The withdrawn diluted draw solution in block 32 can be heated to separate constituent gases from the solvent. If the solvent is water, the water can be withdrawn, possibly as potable water, to the block 36 as indicated by the arrow 37. The constituent gases can be withdrawn from the block 32 to the unit 38, as indicated by the arrow 39. If desired, these constituent gases can be reintroduced into the draw solution supply tank 15 via the recapture unit 40 as indicated by the arrows 41, or into appropriate solvent to form fresh draw solution. Solvent, for example water, could also be added to the recapture unit 40 prior to return of the constituent gases to the supply tank 15.

Figure 4:
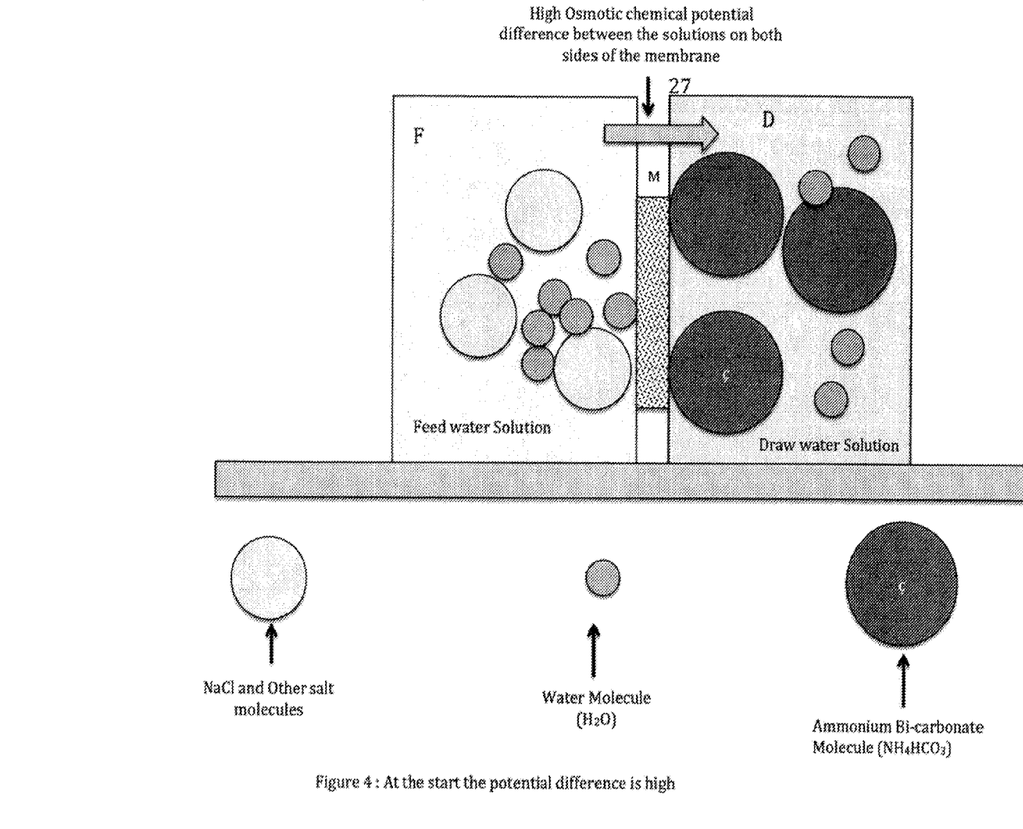
FIG. 4 illustrates the high osmotic chemical difference between feed water and draw water solutions at the beginning of, by way of example only, a desalination process implementing the method and apparatus of the present invention.

FIGS. 4 to 7 schematically illustrate how the osmotic process of the present application for reducing the total dissolved solids of a solution actually works. Again, in the illustrated embodiment the process will be shown and described in conjunction with the desalination of water. In FIG. 4, the state of the feed solution chambers F and the draw solution chambers D is illustrated. Here it can clearly be seen that the molar concentration, for example of sodium chloride, in the feed solution is less than the molar concentration, for example of ammonium bicarbonate, in the draw solution, thus giving rise to the high osmotic chemical potential difference between the feed solution and the draw solution. This high osmotic chemical potential difference on opposite sides of the membrane M makes possible the migration or flow of solvent, here water, from the feed solution chamber F, through the membrane M in the direction of the arrow 27, into the draw solution chamber D.

Figure 5:
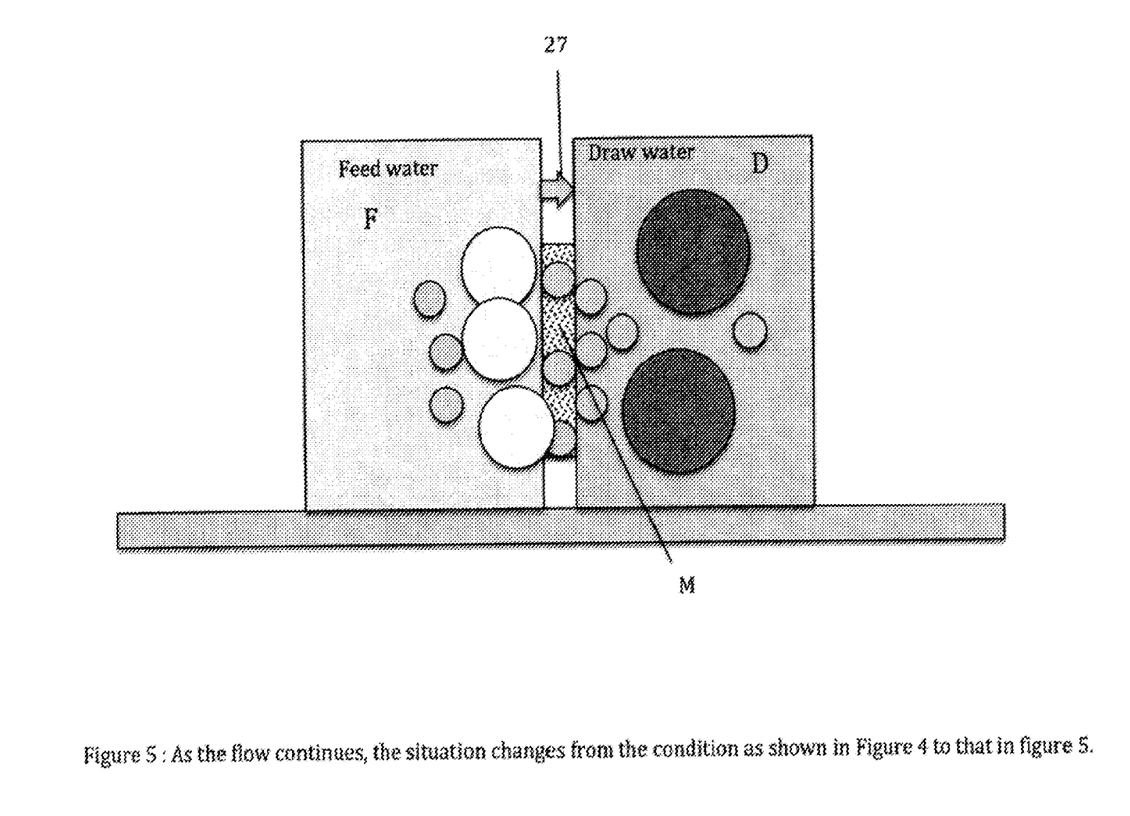
FIG. 5 illustrates the osmotic chemical potential difference after the process has progressed somewhat.

As the flow or migration of solvent through the membranes M continues, the state of the solutions in the chambers F and D changes from that illustrated in FIG. 4 to that illustrated in FIG. 5. As the water molecules migrate or permeate the membranes M, polarization of salt molecules in the feed water solution occurs. In particular, FIG. 5 shows how the smaller water molecules occupy pores of the active layer of the membranes M, and are also present at the interface between the membranes M and the draw solution chamber D. As a result, the chemical potential difference across the membranes M will drop. It can also be seen that the larger salt molecules present in the feed solution accumulate in the feed solution chamber F next to the membrane M. Thus, even if the bulk of the volume of the draw solution in the draw solution chamber D has a higher molar concentration than does the feed solution, in the immediate vicinity of the membranes M the concentration difference can be very slight, or even nil.

When this potential difference is nil, flow or migration of solvent from the feed solution chamber F across the membrane M stops.

Figure 6:
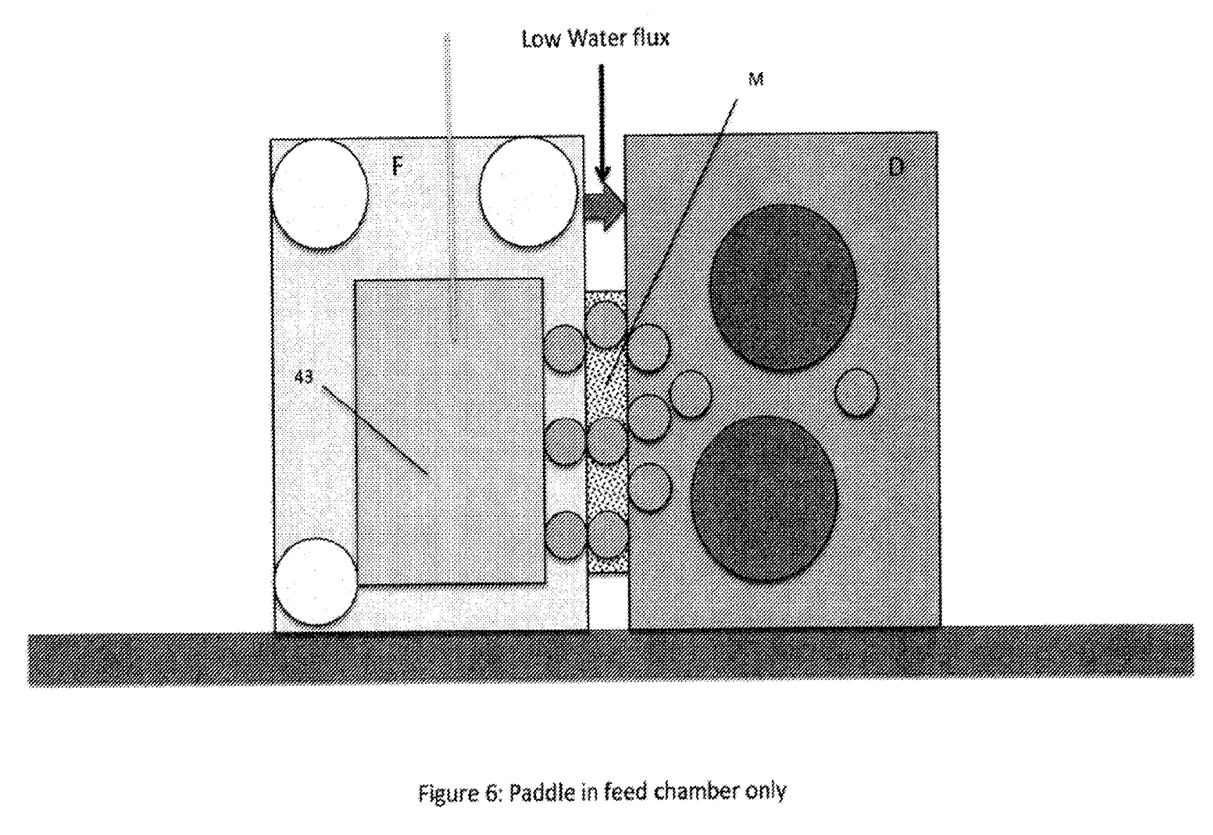
FIG. 6 illustrates sweeping a paddle in only the feed solution chamber.

Measures thus have to be taken to keep the osmotic chemical potential difference high between the feed solution and the draw solution that are on opposite sides of the membranes M. In FIG. 6, a paddle 43 is illustrated on only one side of the membrane M, namely in the feed solution chamber F. Although the single paddle 43 can effectively sweep aside the larger salt molecules in the feed solution chamber F, and can push the smaller water molecules toward the membrane M, water molecules will be present not only in the pores of the membrane M but also on not only the interface between the membrane M and the feed solution chamber F but also on the interface between the membrane M and the draw solution chamber D causing a low osmotic potential difference between the solutions in the feed solution chamber F and draw solution chamber D, that are disposed on opposite sides of the membrane M. Thus, there is still a low to nil driving force for drawing water molecules through the membrane M.

Figure 7:
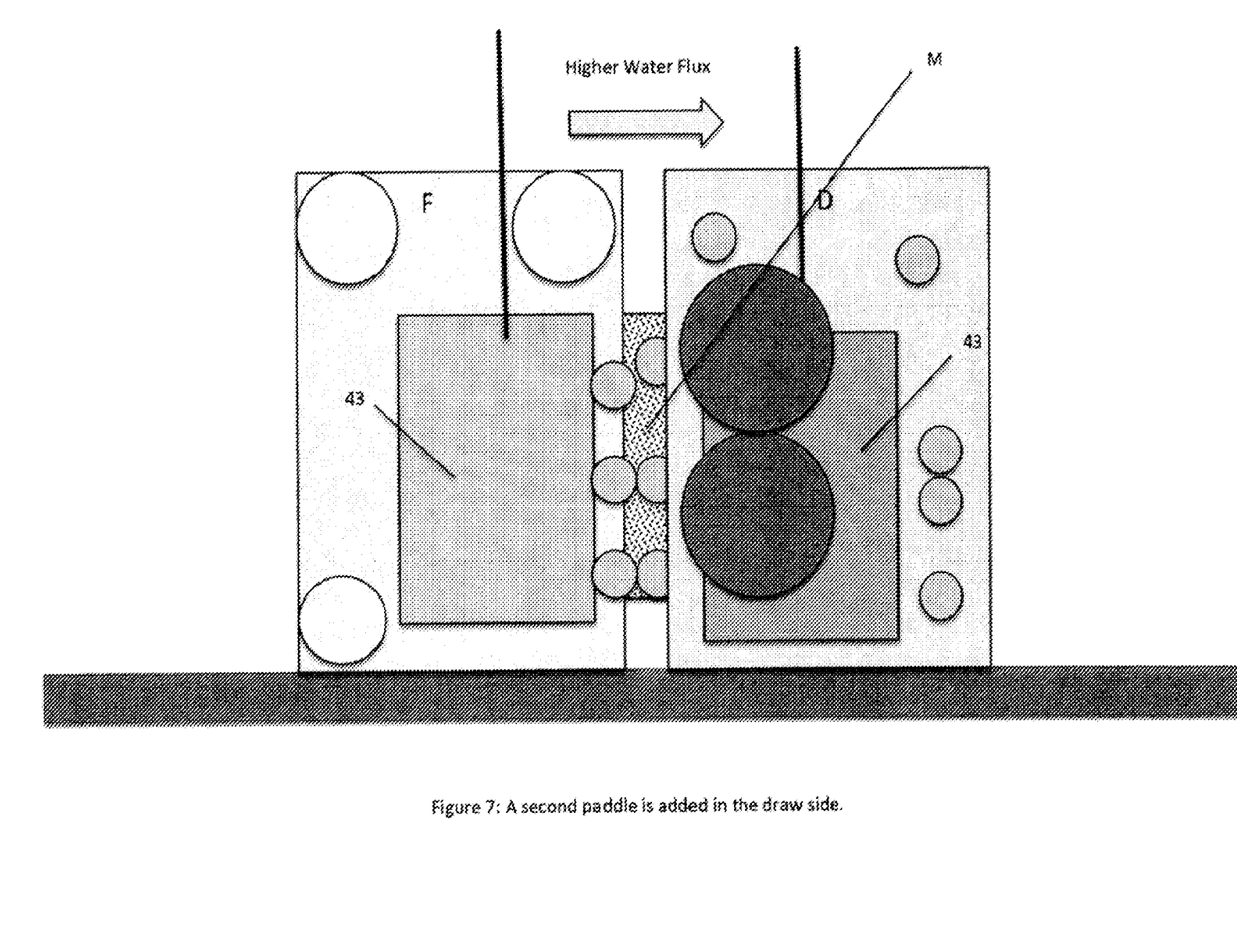
FIG. 7 illustrates sweeping paddles in both the feed solution chambers and the draw solution chambers.

However, pursuant to the present invention, and as illustrated in FIG. 7, when respective paddles 43 are disposed in both the feed solution chambers F and the draw solution chambers D, the opposite faces of the membrane M can be swept. As a consequence, not only is the accumulation of salt removed from the membrane surface that faces the feed solution chamber F, permeate water is removed from the surface of the membrane M that faces the draw solution chamber D. As a result, the high osmotic chemical potential difference can be maintained across the membrane M, thus maintaining a high flux or migration of permeate or solvent water molecules from the feed solution, through the membrane, into the draw solution (compare FIGS. 6 and 7).

The arrangement of the paddles 43 in the feed solution chambers and the draw solution chambers D can be best seen from FIG. 3. The paddles 43 are arranged so as to sweep molecules from adjacent surfaces of membranes M. In FIG. 3, visible gaps are shown between the paddles 43 and the surfaces or faces of the rings 25, i.e. the membranes M thereof, that are to be swept by the paddles 43. These exaggerated gaps are merely to facilitate illustration. In reality, depending upon the material of which the paddles 43 are made, these paddles either rest directly against the rings, or at such a slight distance therefrom that they are capable of sweeping molecules from the surfaces of the membranes yet do not make direct contact with the rings. For example, if the paddles are made of rubber or a polymeric material, they can actually contact the rings 25 since they will not scratch the preferably stainless steel material of the paddles. In contrast, if the paddles themselves are made of metal, such as stainless steel, there will be a slight film-sized gap between the paddles and the surfaces of the membranes/rings that are to be swept.

Although in the illustrated embodiment only one paddle is shown in each of the solution chambers, where sweeping is to take place, it would also be possible, with the exception of the outermost feed solution chambers F, to provide two paddles in each of the remaining solution chambers, namely one that cooperates with the membranes M on one side of the chamber, and another paddle that cooperates with the membranes of the ring disposed on the radially opposite side of the chamber.

The paddles 43 are rotatably supported in their respective solution chambers by means of a bridge or arm 44, with rotation of the bridge or arm 44, and hence of the paddles 43 in their solution chambers in order to effect the sweeping action, being effected by a motor 45, which is disposed in the central space or chamber 26 of the raceway unit 20. While the inner end of the bridge or arm 44 is operatively connected to a drive shaft of the motor 45, the opposite end of the bridge or arm 44 is supported on the outer wall 21 by means of a roller support mechanism, as indicated only schematically by the reference numeral 46 in FIG. 3. Although only one paddle-supporting bridge or arm 44 is illustrated in FIG. 2, two or more such paddle-supporting bridges or arms 44 could be provided in order to provide even more frequent sweeping of the membranes of the rings 25. If a plurality of paddle-supporting bridges or arms 44 are provided, they would preferably be disposed equidistantly from one another.

Figure 10:
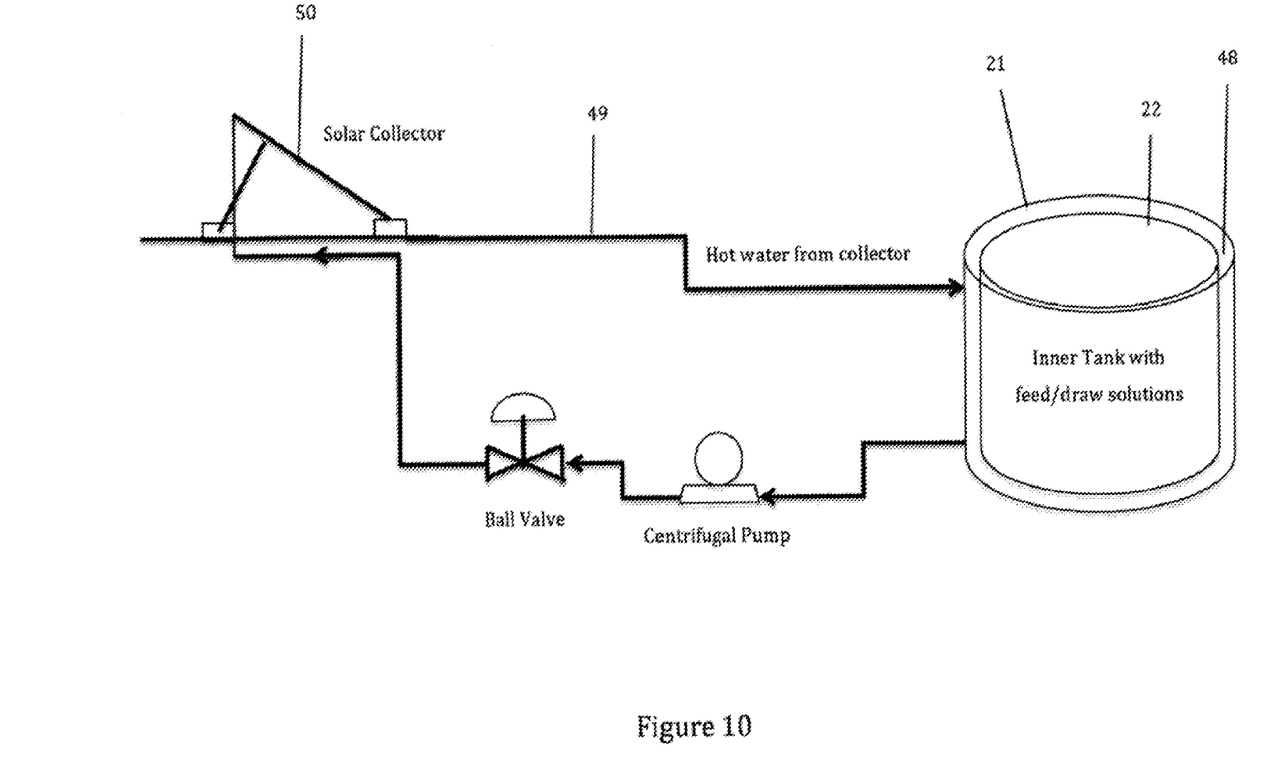
FIG. 10 illustrates a system for conveying hot water or other fluid to a chamber of a raceway unit.

Although in the embodiment illustrated in FIGS. 2 and 3 a space or chamber 48 is provided between the outer wall 21 of the raceway unit 20 and the outer ring 22 of the inner tank, the outer wall 21 could also form the outer delimitation of the inner tank for the feed solution chambers F and the draw solution chambers D. However, a space or chamber between the outer wall 21 and the outer ring 22 can be useful, for example as an overflow chamber, or where a heating or cooling of the inner tank, and hence of the solutions disposed therein, is expedient especially where the process is carried out at ambient pressure. In particular, as shown in FIG. 10, in conjunction with the heating of the inner tank, hot water, or other heating medium, can, as indicated by the arrow 49, be conveyed to the space or chamber 48 from a medium-heating source 50, by way of example only a solar collector, for raising the temperature of the draw solutions, and in particular the feed solutions, to an appropriate processing temperature. Alternatively, or in addition thereto, appropriate heat exchangers could be disposed in the feed lines leading from the feed solution supply tank and the draw solution supply tank to the raceway unit. In addition, appropriate valves and pumps can be provided in the supply and/or return lines.

The present invention is, of course, in no way restricted to the specific disclosure of the specification and drawings, but also encompasses any modifications within the scope of the appended claims.

I claim:

1. An apparatus for reducing the total dissolved solids of a solution, comprising:
   a unit having at least two chambers;
   a respective semi-permeable membrane arrangement disposed between each of said at least two chambers, wherein said semi-permeable membrane arrangement comprises an apertured material, the apertures of which contain semi-permeable membranes, wherein said apertured material is in the form of a ring;
   means to introduce respective solutions into, and withdraw solutions from, said chambers,
   at least one paddle disposed in each of said chambers, wherein said paddles are configured to sweep opposite sides of each of said semi-permeable membrane arrangements; and
   means to provide relative movement between said paddles and said semi-permeable membrane arrangements.

2. An apparatus according to claim 1, wherein said unit has a cylindrical configuration.

3. An apparatus according to claim 2, wherein said unit has three or more chambers, further wherein said chambers are separated from one another by respective apertured membrane-containing rings, and wherein said rings are concentrically disposed.

4. An apparatus according to claim 3, wherein said unit has five chambers, with a respective feed solution chamber being disposed on opposite sides of a respective draw solution chamber.

5. An apparatus according to claim 2, wherein said means to provide relative movement is a motor that is centrally disposed in said unit.

6. An apparatus according to claim 5, further comprising at least one arm, wherein the at least one arm extends from a drive shaft of said motor and over said chambers, and wherein said paddles are connected to said at least one arm.

7. An apparatus according to claim 1, wherein two paddles are disposed in each of said chambers.

8. An apparatus according to claim 1, which further includes means for heating solution in said chambers.

* * * * *